US012705756B2

(12) United States Patent
Lee et al.

(10) Patent No.: US 12,705,756 B2
(45) Date of Patent: Aug. 11, 2026

(54) APPARATUS AND METHOD WITH IMAGE SEGMENTATION

(71) Applicant: Samsung Electronics Co., Ltd., Suwon-si (KR)

(72) Inventors: Solae Lee, Suwon-si (KR); Seungin Park, Suwon-si (KR); Hyeongseok Son, Suwon-si (KR); Byung In Yoo, Suwon-si (KR); Sangil Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 18/471,450

(22) Filed: Sep. 21, 2023

(65) Prior Publication Data

US 2024/0221170 A1 Jul. 4, 2024

(30) Foreign Application Priority Data

Dec. 29, 2022 (KR) ........................ 10-2022-0189266

(51) Int. Cl.
*G06T 7/00* (2017.01)
*G06T 7/149* (2017.01)

(52) U.S. Cl.
CPC .... *G06T 7/149* (2017.01); *G06T 2207/20081* (2013.01)

(58) Field of Classification Search
CPC . G06T 7/149; G06T 2207/20081; G06T 7/11; G06T 7/174; G06T 5/50
See application file for complete search history.

(56) References Cited

U.S. PATENT DOCUMENTS 10,860,836 B1 * 12/2020 Tyagi .................. G06V 10/454
2020/0279122 A1 * 9/2020 Lee .......................... G06T 5/77
2021/0248418 A1 8/2021 Guo et al.
2021/0256707 A1 8/2021 Brown et al.
2021/0334976 A1 10/2021 Lee et al.
2022/0044075 A1 2/2022 Tremblay et al.
2022/0172369 A1 6/2022 Tana et al.
2022/0207861 A1 * 6/2022 Li .......................... G06V 20/70
2022/0207866 A1 * 6/2022 Li .......................... G06V 20/70

(Continued)

FOREIGN PATENT DOCUMENTS

KR 10-2020-0027425 A 3/2020
KR 10-2020-0105004 A 9/2020

OTHER PUBLICATIONS

Ling, Evan, et al., "Humans Need Not Label More Humans: Occlusion Copy & Paste for Occluded Human Instance Segmentation", arXiv:2210.03686v1, Oct. 7, 2022, (13 Pages in English). (Year: 2022).*

(Continued)

*Primary Examiner* — Van D Huynh
(74) *Attorney, Agent, or Firm* — NSIP Law

(57) ABSTRACT

An apparatus with image segmentation includes: one or more processors configured to: obtain a second image based on a first segmentation label corresponding to a first image; generate a composite image by composing an image of an object corresponding to an object class of the first image among objects comprised by the second image with the first image; and train an image segmentation model based on the composite image, the first image, and the second image.

20 Claims, 8 Drawing Sheets

(56) References Cited

U.S. PATENT DOCUMENTS

| | | | | |
|---|---|---|---|---|
| 2022/0292313 | A1* | 9/2022 | Martinez | G06T 11/00 |
| 2023/0022387 | A1* | 1/2023 | Shen | G06V 20/41 |
| 2023/0154185 | A1* | 5/2023 | Kuen | G06V 10/751 382/100 |
| 2023/0306611 | A1* | 9/2023 | Nevatie | G06V 10/751 |
| 2023/0326030 | A1* | 10/2023 | Nevatie | G06T 7/11 382/155 |
| 2023/0419648 | A1* | 12/2023 | Ghafoorian | G06V 10/82 |
| 2024/0153038 | A1* | 5/2024 | Duan | G06T 7/11 |

OTHER PUBLICATIONS

Ling, Evan, et al., "Humans Need Not Label More Humans: Occlusion Copy & Paste for Occluded Human Instance Segmentation", arXiv:2210.03686v1, Oct. 7, 2022, (13 Pages in English).

Korean Office Action Issued on Oct. 1, 2025, in Counterpart Korean Patent Application No. 10-2022-0189266 (5 Pages in English, 7 Pages in Korean).

* cited by examiner

APPARATUS AND METHOD WITH IMAGE SEGMENTATION

CROSS-REFERENCE TO RELATED APPLICATIONS

This application claims the benefit under 35 USC § 119(a) of Korean Patent Application No. 10-2022-0189266, filed on Dec. 29, 2022 in the Korean Intellectual Property Office, the entire disclosure of which is incorporated herein by reference for all purposes.

BACKGROUND

1. Field

The following description relates to an apparatus and method with image segmentation.

2. Description of Related Art

Image segmentation may refer to an operation of segmenting objects in an image. Semantic segmentation may be an image segmentation method that does not classify instances of a class, and instance segmentation may be an image segmentation method that classifies instances of a class.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an apparatus with image segmentation includes: one or more processors configured to: obtain a second image based on a first segmentation label corresponding to a first image; generate a composite image by composing an image of an object corresponding to an object class of the first image among objects comprised by the second image with the first image; and train an image segmentation model based on the composite image, the first image, and the second image.

The first segmentation label may include a semantic segmentation label.

For the obtaining the second image, the one or more processors may be configured to: generate the first segmentation label from the first image by using a semantic segmentation model; and obtain, as the second image, an image comprising the object corresponding to the object class, based on the first segmentation label.

The semantic segmentation model may be different from the image segmentation model.

For the training of the image segmentation model, the one or more processors may be configured to: generate a second segmentation label corresponding to the composite image by using the image segmentation model; determine a first loss for a pixel corresponding to the composite image, based on the second segmentation label; generate a loss mask based on either one or both of the first image and the second image; and train the image segmentation model based on the first loss and the loss mask.

The second segmentation label may include an instance segmentation label.

For the determining of the first loss, the one or more processors may be configured to: determine pseudo ground truth based on either one or both of the first image and the second image; and determine the first loss by comparing the second segmentation label with the pseudo ground truth.

For the training of the image segmentation model based on the first loss and the loss mask, the one or more processors may be configured to train the image segmentation model by using a second loss for a pixel corresponding to the loss mask among the first loss.

For the training of the image segmentation model by using the second loss, the one or more processors may be configured to train the image segmentation model by using the second loss, based on performance of the image segmentation model.

For the training of the image segmentation model by using the second loss, based on the performance of the image segmentation model, the one or more processors may be configured to train the image segmentation model by using the second loss in response to intersection over union (IoU) for the image segmentation model being greater than or equal to a threshold.

The one or more processors may be configured to generate an instance segmentation map corresponding to an input image using the trained image segmentation model.

In one or more general aspects, a processor-implemented method with image segmentation includes: obtaining a second image based on a first segmentation label corresponding to a first image; generating a composite image by composing an image of an object corresponding to an object class of the first image among objects comprised by the second image with the first image; and training an image segmentation model based on the composite image, the first image, and the second image.

The obtaining of the second image may include: generating the first segmentation label from the first image by using a semantic segmentation model; and obtaining, as the second image, an image comprising the object corresponding to the object class, based on the first segmentation label.

The training of the image segmentation model may include: generating a second segmentation label corresponding to the composite image by using the image segmentation model; determining a first loss for a pixel corresponding to the composite image, based on the second segmentation label; generating a loss mask based on either one or both of the first image and the second image; and training the image segmentation model based on the first loss and the loss mask.

The second segmentation label may include an instance segmentation label.

The determining of the first loss may include: determining pseudo ground truth based on either one or both of the first image and the second image; and determining the first loss by comparing the second segmentation label with the pseudo ground truth.

The training of the image segmentation model based on the first loss and the loss mask may include training the image segmentation model by using a second loss for a pixel corresponding to the loss mask among the first loss.

The training of the image segmentation model by using the second loss may include training the image segmentation model by using the second loss, based on performance of the image segmentation model.

The training of the image segmentation model by using the second loss, based on the performance of the image segmentation model may include training the image segmentation model by using the second loss in response to intersection over union (IoU) for the image segmentation model being greater than or equal to a threshold.

In one or more general aspects, an apparatus with image segmentation includes: one or more processors configured to generate an instance segmentation map corresponding to an input image using a trained image segmentation model; wherein the image segmentation model is trained based on a composite image, the composite image is generated by composing an image of an object corresponding to an object class of a first image among objects comprised by a second image with the first image, and the second image is obtained based on a first segmentation label corresponding to the first image.

Other features and aspects will be apparent from the following detailed description, the drawings, and the claims.

Figure 1:
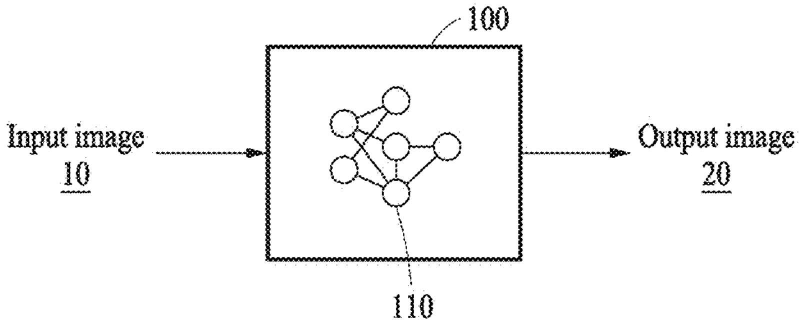
FIG. 1 illustrates an example of an image segmentation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the examples. The singular forms "a", "an", and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Hereinafter, the examples are described in detail with reference to the accompanying drawings. When describing the examples with reference to the accompanying drawings, like reference numerals refer to like elements and a repeated description related thereto will be omitted.

FIG. 1 illustrates an example of an image segmentation apparatus.

Referring to FIG. 1, an image segmentation apparatus 100 may generate an output image 20 (e.g., an instance segmentation map 81 of FIG. 8) corresponding to an input image 10 by using an image segmentation model 110 (e.g., a trained image segmentation model).

The image segmentation apparatus 100 may train the image segmentation model 110 (e.g., may generate the trained image segmentation model) to perform instance segmentation based on a semantic segmentation label. The image segmentation model 110 may include a segmentation model (e.g., a segmentation module 800 or including a scratch model) not suitable for instance segmentation.

Figure 2:
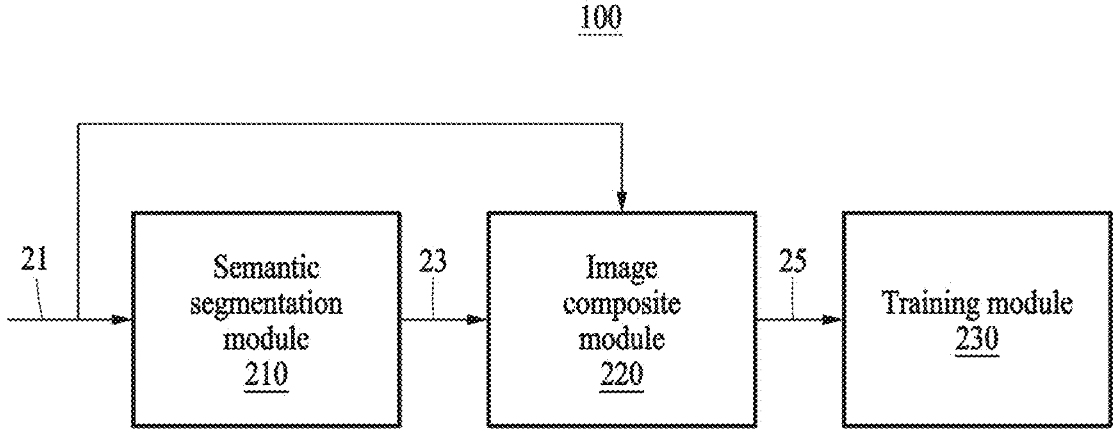
FIG. 2 illustrates an example of an image segmentation apparatus.

FIG. 2 illustrates an example of an image segmentation apparatus.

Referring to FIG. 2, an image segmentation apparatus 100 may include a semantic segmentation module 210, an image composite module 220, and a training module 230.

The semantic segmentation module 210 may generate and output a first semantic segmentation map 23 corresponding to a first image 21 (e.g., a first image 41 of FIG. 4) based on an input of the first image 21. The first semantic segmentation map 23 may include respective segmentation labels (e.g., semantic segmentation labels) for objects included in the first image 21. The first image 21 may be obtained in various methods. For example, the first image 21 may be input by a user, obtained from a database (e.g., a database stored in a memory of FIG. 10), or obtained from a sensor (e.g., a camera) of the image segmentation apparatus (e.g., a sensor of image segmentation apparatus 1000 of FIG. 10 configured to communicate with a processor 1020 and a memory 1040 of FIG. 10).

The image composite module 220 may generate and output a composite image 25 (e.g., a composite image 51 of FIG. 5 or a composite image 71 of FIGS. 7 and 8) based on an input of the first image 21 and/or the first semantic segmentation map 23. Examples of a description of the image composite module 220 may be provided in detail below with reference to FIGS. 3 to 5.

The training module 230 may train a segmentation model (e.g., the image segmentation model 110 of FIG. 1 and/or a segmentation module 800 of FIG. 8) based on an input of the composite image 25. Examples of a description of the training module 230 may be provided in detail below with reference to FIGS. 6 to 8.

Figure 3:
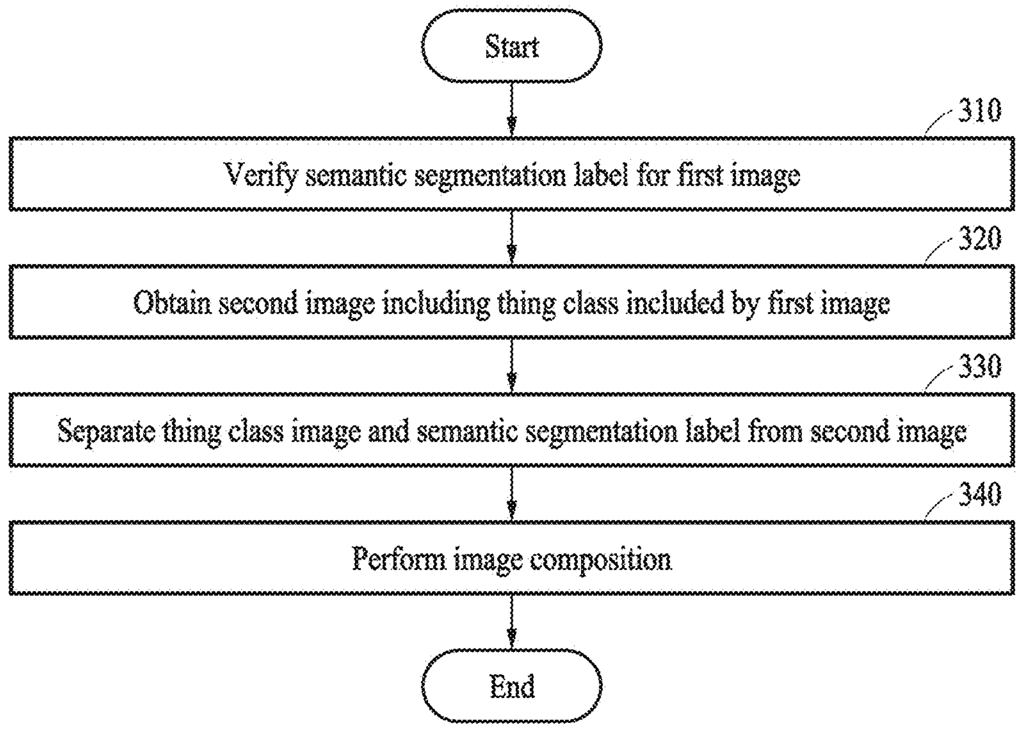
FIGS. 3 to 5 illustrate examples of an image composite module.
Figure 4:
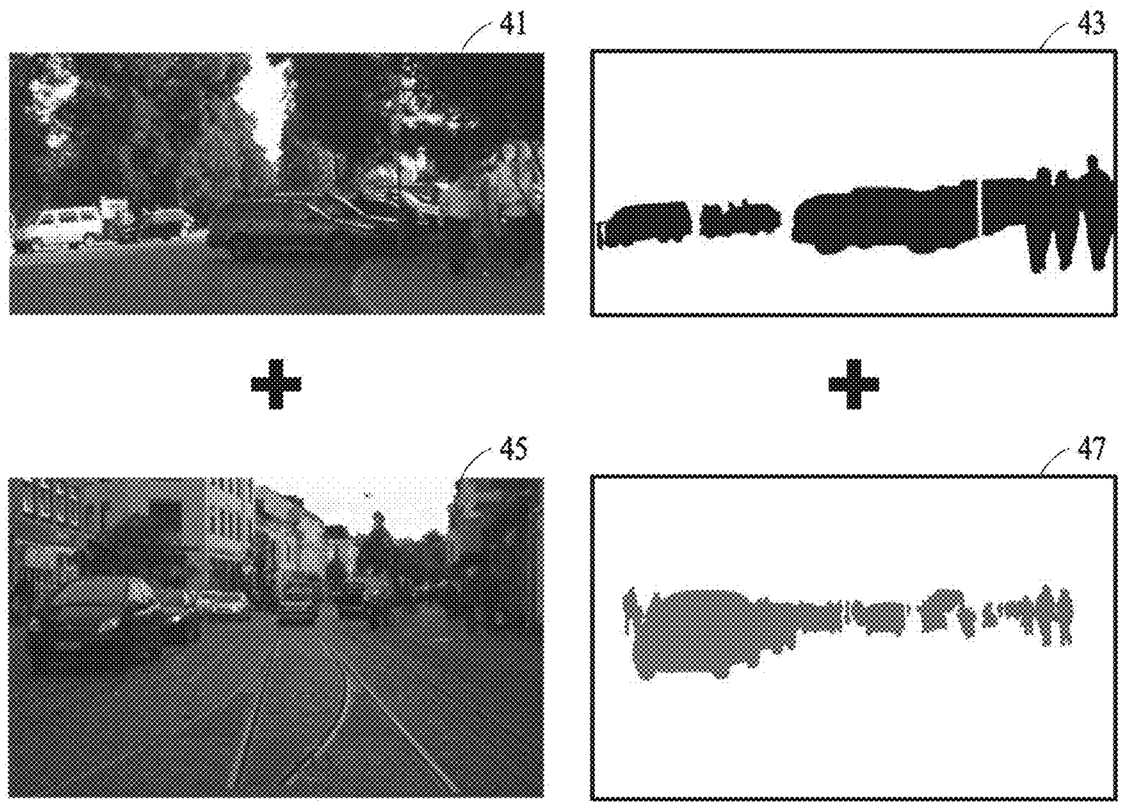
Figure 5:
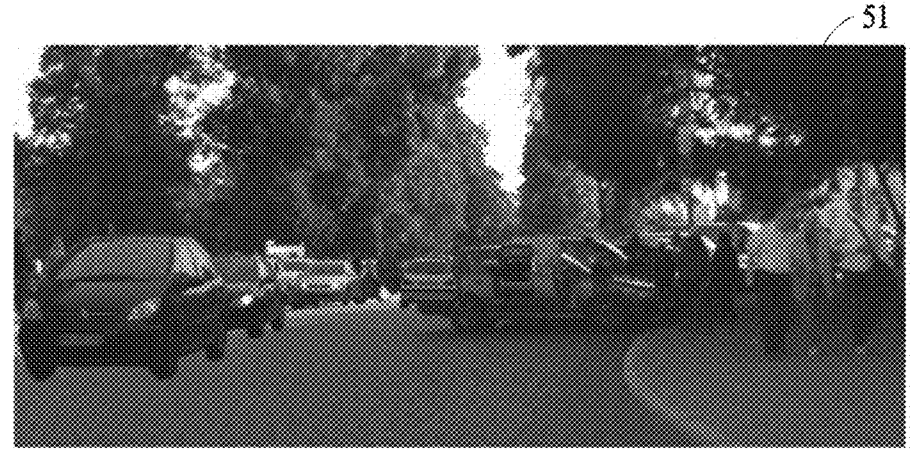
Figure 5:
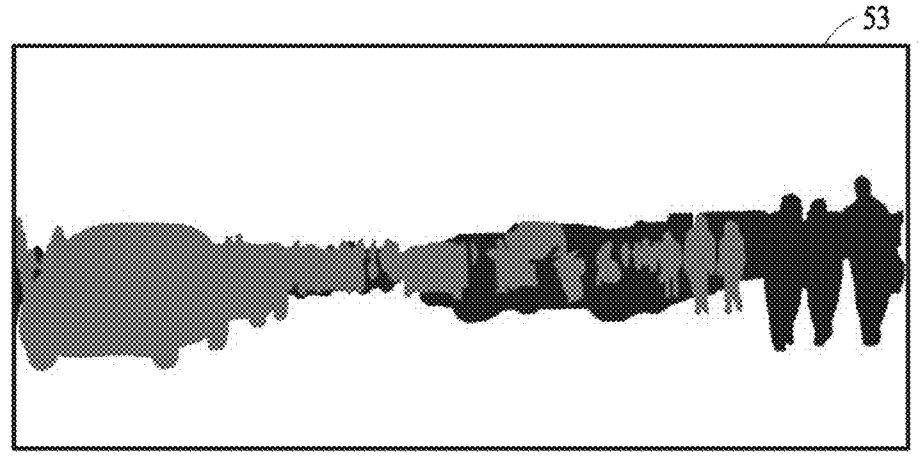

FIGS. 3 to 5 illustrate examples of an image composite module. FIG. 3 is a flowchart illustrating an operation of an image composite module (e.g., the image composite module 220 of FIG. 2) and FIGS. 4 and 5 are diagrams illustrating an example of image composition.

Referring to FIGS. 3 to 5, operations 310 to 340 may be sequentially performed, but examples are not limited thereto. For example, two or more operations may be parallelly performed.

In operation 310, the image composite module 220 may verify, for a thing class (e.g., a car or a person), a semantic segmentation label (e.g., a semantic segmentation label 43 of FIG. 4) included in an output (e.g., the first semantic segmentation map 23 of FIG. 2) of a semantic segmentation module (e.g., the semantic segmentation module 210 of FIG. 2). The thing class (e.g., an object class) may represent an object having a well-defined shape, such as a car and/or a person, and a stuff class (e.g., a scenery class) may represent an amorphous background region, such as a sky, a road, and/or grass.

In operation 320, the image composite module 220 may obtain a second image (e.g., a second image 45 of FIG. 4) and a second semantic segmentation map (e.g., a second semantic segmentation map including a semantic segmentation label 47 of FIG. 4) corresponding to the second image 45, in which the second image 45 includes the thing class (e.g., the car or the person) included in the output (e.g., the first semantic segmentation map 23) of the semantic segmentation module (e.g., the semantic segmentation module 210). For example, the image composite module 220 may obtain the second image 45 and the second semantic segmentation map from a database. The image composite module 220 may obtain one or more second images (e.g., the second image 45). Hereinafter, an example of one second image (e.g., the second image 45) is provided for ease of description.

In operation 330, the image composite module 220 may separate a thing class image (e.g., a car image or a person image) from the second image 45 and separate the semantic segmentation label 47 (e.g., a semantic segmentation label for the thing class) from the second semantic segmentation map.

In operation 340, the image composite module 220 may generate and output a composite image 51 (e.g., the composite image 25 of FIG. 2 or the composite image 71 of FIGS. 7 and 8) by composing the thing class image (e.g., the car image or the person image) separated from the second image 45 with a first image 41 (e.g., the first image 21 of FIG. 2). The image composite module 220 may generate and output a composite semantic segmentation label 53 by composing the semantic segmentation label 47 corresponding to the second image 45 with the semantic segmentation label 43 corresponding to the first image 41.

Figure 6:
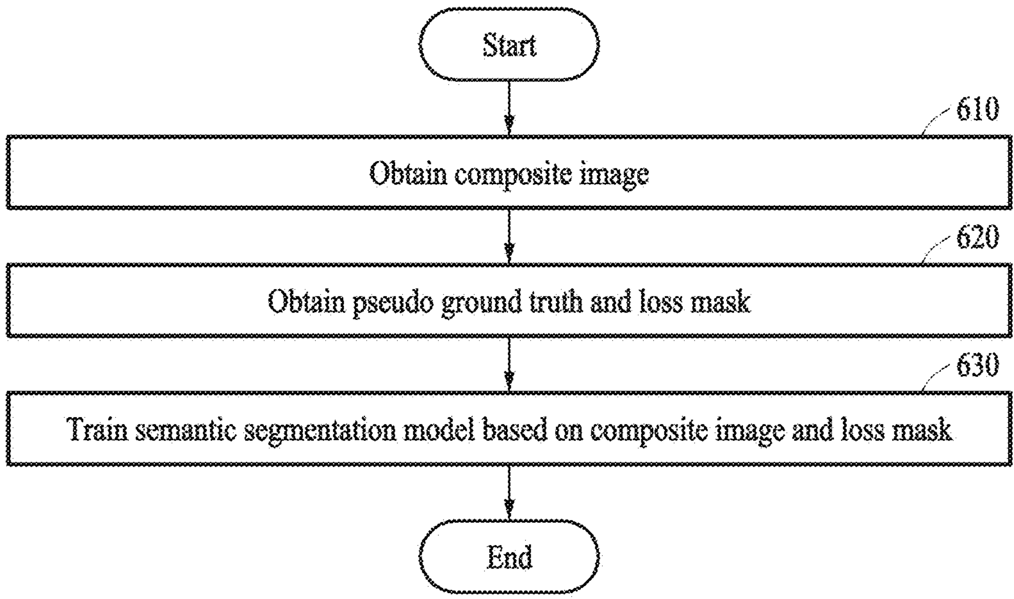
FIG. 6 illustrates an example of a training module.

FIG. 6 illustrates an example of a training module.

Referring to FIG. 6, operations 610 to 630 may be sequentially performed, but examples are not limited thereto. For example, two or more operations may be parallelly performed.

Figure 7:
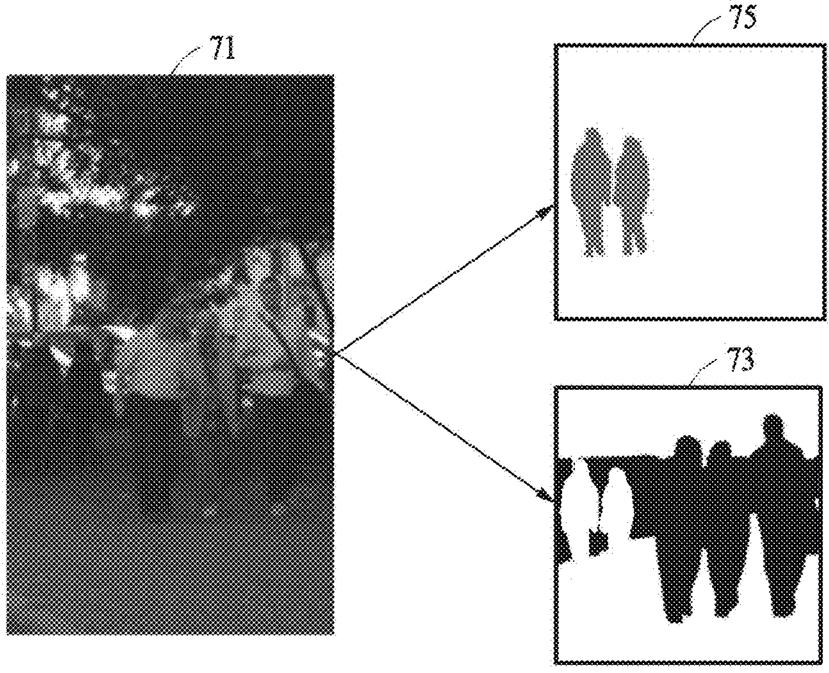
FIG. 7 illustrates an example of obtaining pseudo ground truth and a loss mask.

In operation 610, a training module (e.g., the training module 230 of FIG. 2) may obtain (e.g., generate) a composite image (e.g., the composite image 25 of FIG. 2, the composite image 51 of FIG. 5, or the composite image 71 of FIG. 7).

Figure 8:
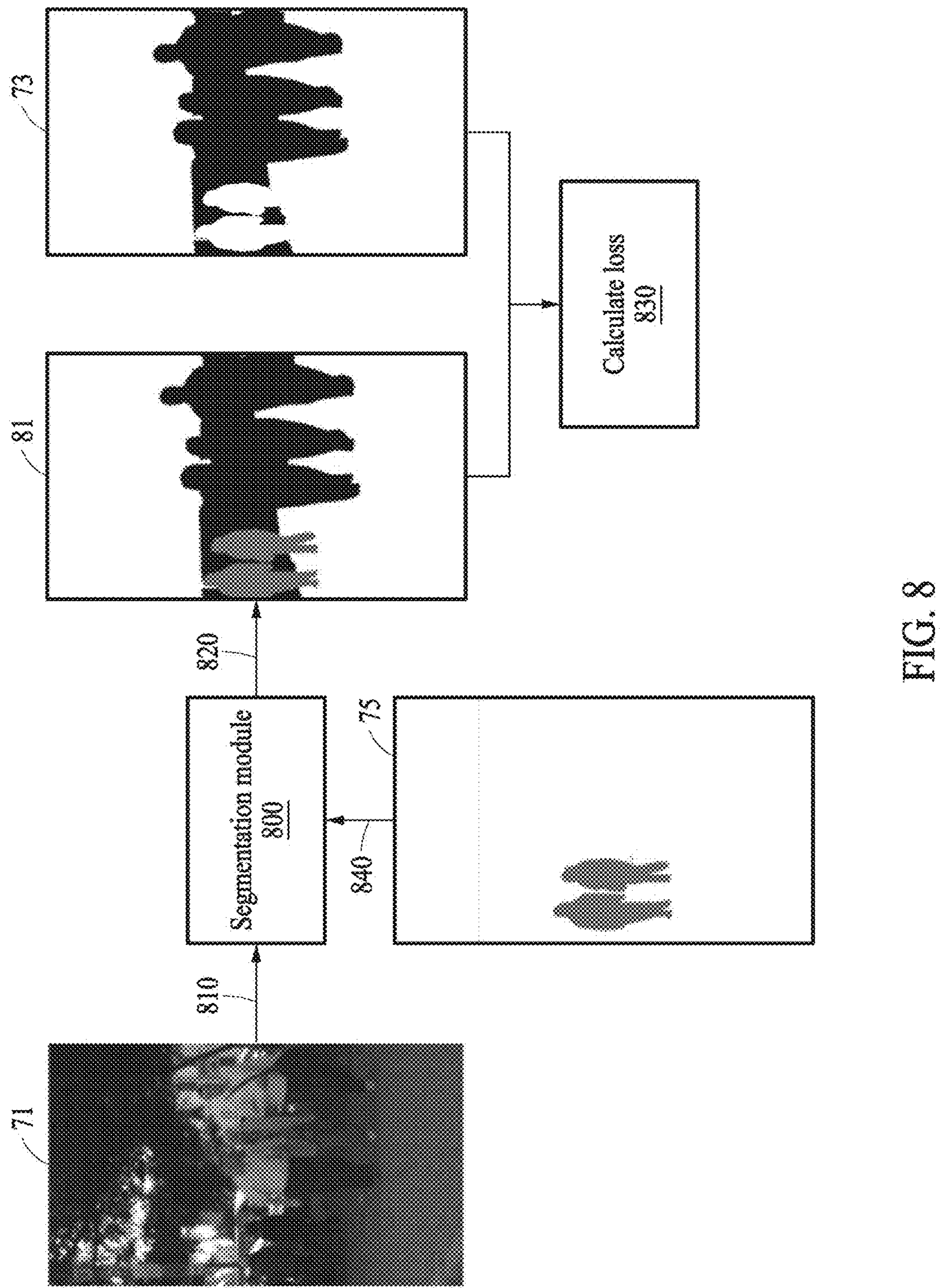
FIG. 8 illustrates an example of training a segmentation module.

In operation 620, the training module (e.g., the training module 230) may obtain a loss mask (e.g., a loss mask 75 of FIGS. 7 and 8). An example of a description of obtaining the loss mask 75 is provided in detail below with reference to FIG. 7.

In operation 630, the training module 230 may train a segmentation model (e.g., the image segmentation model 110 of FIG. 1 or the segmentation module 800 of FIG. 8) based on the composite image 25, 51, or 71 and the loss mask 75. An example of a method of training the segmentation model 110 or 800 (e.g., a semantic segmentation model) is described in detail below with reference to FIG. 8. In a non-limiting example, in operation 630, the training module 230 further may generate an output image (e.g., an output image 20 of FIG. 1) corresponding to an input image (e.g., an input image 10 of FIG. 1) by using the trained segmentation model.

FIG. 7 illustrates an example of obtaining pseudo ground truth and a loss mask.

Referring to FIG. 7, a composite image 71 (e.g., the composite image 25 of FIG. 2 or the composite image 51 of FIG. 5) may be a composite image of thing class images (e.g., car images or person images) respectively included in a first image (e.g., the first image 21 of FIG. 2 or the first image 41 of FIG. 4) and one or more second images (e.g., the second image 45 of FIG. 4). For ease of description, the composite image 71, which enlarges a part of the composite image 51, is provided as an example.

When the number of second images (e.g., the second image 45) is 1, a training module (e.g., the training module 230 of FIG. 2) may obtain one or more pseudo ground truths based on one or more images among the first image 21 or 41 or the second image (e.g., the image 45). For example, the training module 230 may obtain pseudo ground truth 73 corresponding to the first image 21 or 41 and/or pseudo ground truth 75 corresponding to the second image 45. Pseudo ground truth (e.g., the pseudo ground truth 73 and/or the pseudo ground truth 75) may include a semantic segmentation label for a thing class image (e.g., a car image or a person image) included in an image (e.g., the first image 21 or 41 and/or the second image 45) corresponding to the pseudo ground truth. The training module 230 may obtain one or more loss masks corresponding to the obtained one or more pseudo ground truths. For example, the training module 230 may obtain a loss mask 75 corresponding to the pseudo ground truth 73 and/or a loss mask 73 corresponding to the pseudo ground truth 75. The loss mask 75 may be obtained based on the second image 45 and the loss mask 73 may be obtained based on the first image 41.

When the number of second images is plural, the training module 230 may obtain pseudo ground truth based on one or more images among the first image 21 or 41 and a plurality of second images. For example, the training module 230 may obtain the pseudo ground truth 73 corresponding to the first image 21 or 41 and/or one or more pseudo ground truths respectively corresponding to one or more second images among the plurality of second images. The training module 230 may obtain one or more loss masks respectively corresponding to the obtained one or more pseudo ground truths. For example, the training module 230 may obtain a loss mask based on the rest of the images (e.g., the plurality of second images) excluding an image (e.g., the first image 21 or 41) corresponding to pseudo ground truth (e.g., the pseudo ground truth 73) among the first image 21 or 41 and the plurality of second images. The loss mask may include a composite semantic segmentation label of respective semantic segmentation labels for thing class images respectively included in the rest of the images (e.g., the plurality of second images) excluding the image (e.g., the first image 21 or 41) corresponding to the pseudo ground truth (e.g., the pseudo ground truth 73).

FIG. 8 illustrates an example of training a segmentation module.

Referring to FIG. 8, operations 810 to 840 may be sequentially performed, but examples are not limited thereto. For example, two or more operations may be parallelly performed.

In operation 810, a training module (e.g., the training module 230 of FIG. 2) may input a composite image 71 (e.g., the composite image 27 of FIG. 2 or the composite image 51 of FIG. 5) to an image segmentation module 800 (e.g., the image segmentation model 110 of FIG. 1). The segmentation module 800, before being trained, may be a segmentation module not suitable for instance segmentation. The segmentation module 800 may perform instance segmentation by being trained based on pseudo ground truth (e.g., pseudo ground truth 73). The segmentation module 800 may be the same as or different from a semantic segmentation module (e.g., the semantic segmentation module 210 of FIG. 2) for outputting a first semantic segmentation map (e.g., the first semantic segmentation map 23 of FIG. 1) corresponding to a first image (e.g., the first image 21 of FIG. 2 or the first image 41 of FIG. 4).

In operation 820, the training module 230 may output a second segmentation map 81 corresponding to the composite image 71 by using the segmentation module 800. The second segmentation map 81 may include a segmentation label (e.g., an instance segmentation label) for a thing class included in the composite image 71. As the segmentation module 800 is further trained, the segmentation module 800 may more appropriately perform instance segmentation on an input image (e.g., the input image 10 of FIG. 1).

In operation 830, the training module 230 may calculate (e.g., determine) a first loss for pixels corresponding to the composite image 71 based on the second segmentation map 81 and/or the pseudo ground truth 73. For example, the training module 230 may calculate the first loss by comparing the second segmentation map 81 with the pseudo ground truth 73. Although an example of one version of pseudo ground truth (e.g., the pseudo ground truth 73) is provided for ease of description in FIG. 8, the training module 230 may calculate the first loss based on the second segmentation map 81 and/or one or more pseudo ground truths (e.g., the pseudo ground truth 73 and pseudo ground truth 75). For example, the training module 230 may also calculate the first loss by comparing the second segmentation map 81 with each of the one or more pseudo ground truths (e.g., the pseudo ground truth 73 and the pseudo ground truth 75).

In operation 840, the training module 230 may train the segmentation module 800 based on the performance of the segmentation module 800, the first loss (e.g., the first loss calculated in operation 830), and a loss mask 75. For example, when an evaluation indicator (e.g., intersection over union (IoU)) for the performance of the segmentation module 800 is greater than or equal to a threshold value, the training module 230 may train the segmentation module 800 by using a second loss for pixels corresponding to the loss mask 75 among the first loss. For example, when the evaluation indicator (e.g., the IoU) for the performance of the segmentation module 800 is less than the threshold value, the training module 230 may train the segmentation module 800 by using the first loss (e.g., the second loss for the pixels corresponding to the loss mask 75 among the first loss). Although an example of one loss mask (e.g., the loss mask 75) corresponding to one version of pseudo ground truth (e.g., the pseudo ground truth 73) is provided for ease of description in FIG. 8, the training module 230 may train the segmentation module 800 by using a plurality of loss masks (e.g., the loss mask 75 and a loss mask 73) corresponding to one or more pseudo ground truths (e.g., the pseudo ground truth 73 and the pseudo ground truth 75).

An image segmentation apparatus (e.g., the image segmentation apparatus 100 of FIG. 1) may provide the segmentation module 800 for performing instance segmentation without an instance segmentation label by training the segmentation module 800 based on the composite image 71 and/or the loss mask 75.

Figure 9:
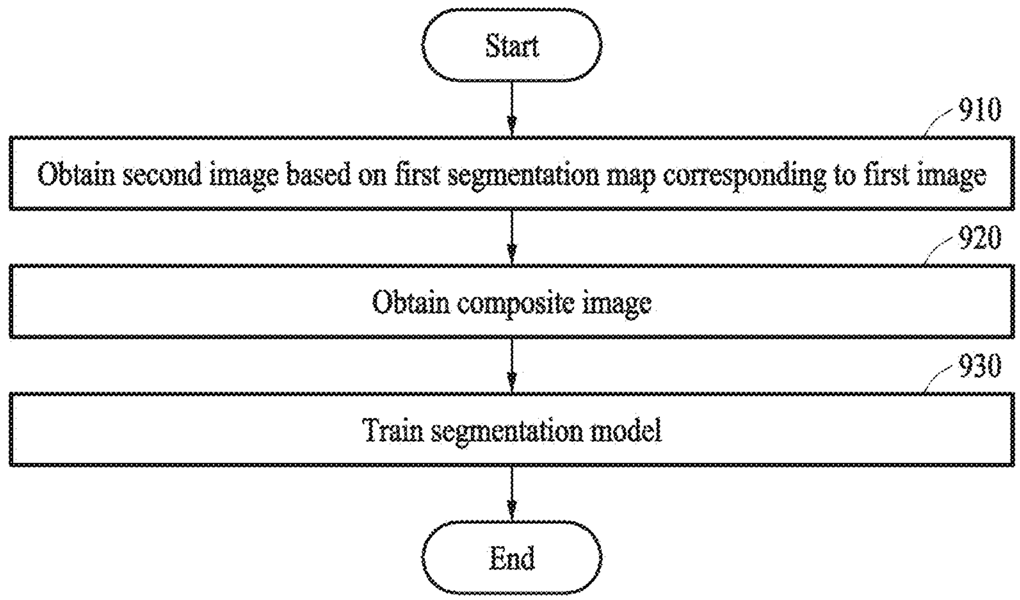
FIG. 9 illustrates an example of an operation of an image segmentation apparatus.

FIG. 9 illustrates an example of an operation of an image segmentation apparatus.

Referring to FIG. 9, operations 910 to 930 may be practically the same as the operations of the image segmentation apparatus (e.g., the image segmentation apparatus 100 of FIG. 1) described with reference to FIGS. 1 to 8. Accordingly, a repeated description thereof is omitted. Operations 910 to 930 may be sequentially performed, but examples are not limited thereto. For example, two or more operations may be parallelly performed.

In operation 910, the image segmentation apparatus 100 may obtain a second image (e.g., the second image 45 of FIG. 4) based on a segmentation label (e.g., the semantic segmentation label 43 of FIG. 4) corresponding to a first image (e.g., the first image 21 of FIG. 2 or the first image 41 of FIG. 4).

In operation 920, the image segmentation apparatus 100 may generate a composite image (e.g., the composite image 25 of FIG. 2, the composite image 51 of FIG. 5, or the composite image of FIGS. 7 and 8) by composing an image of an object corresponding to a thing class of the first image 21 or 41 among objects included in the second image 45 with the first image 21 or 41.

In operation 930, the image segmentation apparatus 100 may train an image segmentation model (e.g., the image segmentation model 110 of FIG. 1 or the segmentation module 800 of FIG. 8) based on the composite image 25, 51, or 71, the first image 21 or 41, and the second image 45. In a non-limiting example, in operation 930, the image segmentation apparatus 100 further may generate an output image (e.g., an output image 20 of FIG. 1) corresponding to an input image (e.g., an input image 10 of FIG. 1) by using the trained segmentation model. The input image may be obtained from a sensor (e.g., a camera) of the image segmentation apparatus 100.

Figure 10:
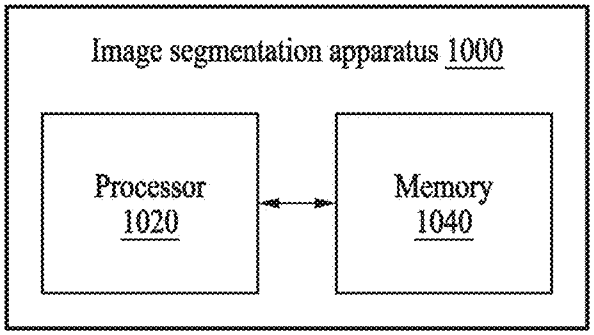
FIG. 10 illustrates an example of an image segmentation apparatus.

FIG. 10 illustrates an example of an image segmentation apparatus.

Referring to FIG. 10, an image segmentation apparatus 1000 (e.g., the image segmentation apparatus 100 of FIG. 1) may include a processor 1020 (e.g., one or more processors) and a memory 1040 (e.g., one or more memories).

The memory 1040 may store instructions (or programs) executable by the processor 1020. For example, the instructions may include instructions for executing an operation of the processor 1020 and/or an operation of each component of the processor 1020.

The memory 1040 may include one or more computer-readable storage media. The memory 1040 may include non-volatile storage elements (e.g., a magnetic hard disk, an optical disc, a floppy disc, a flash memory, electrically programmable memory (EPROM), and/or electrically erasable and programmable memory (EEPROM)).

The memory 1040 may be a non-transitory medium. The term "non-transitory" may indicate that a storage medium is not embodied in a carrier wave or a propagated signal. However, the term "non-transitory" should not be interpreted to mean that the memory 1040 is non-movable.

The processor 1020 may process data stored in the memory 1040. The processor 1020 may execute computer-readable code (e.g., software) stored in the memory 1040 and instructions triggered by the processor 1020. For example, the memory 1040 may be or include a non-transitory computer-readable storage medium storing instructions that, when executed by the processor 1020, configure the processor 1020 to perform any one, any combination, or all of the operations and methods described herein with reference to FIGS. 1-10.

The processor 1020 may be a hardware-implemented data processing device including a circuit that is physically structured to execute desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and/or a field-programmable gate array (FPGA).

The operations performed by the processor 1020 may be practically the same as the operations of the image segmentation apparatus (e.g., the image segmentation apparatus 100 of FIG. 1) described with reference to FIGS. 1 to 9. Accordingly, further description thereof is not repeated herein.

The image segmentation apparatuses, semantic segmentation modules, image composite modules, training modules, segmentation modules, processors, memories, image segmentation apparatus 100, semantic segmentation module 210, image composite module 220, training module 230, segmentation module 800, image segmentation apparatus 1000, processor 1020, memory 1040, and other apparatuses, devices, units, modules, and components disclosed and described herein with respect to FIGS. 1-10 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An apparatus with image segmentation, the apparatus comprising:

one or more processors configured to:

obtain a second image based on a first segmentation label corresponding to a first image;

generate an object class image separated from the second image, the object class image comprising an object corresponding to an object class of the first image;

generate a composite image by composing the object class image with the first image; and train an image segmentation model based on the composite image, the first image, and the second image.

2. The apparatus of claim 1, wherein the first segmentation label comprises a semantic segmentation label.

3. The apparatus of claim 1, wherein, for the obtaining the second image, the one or more processors are configured to:

generate the first segmentation label from the first image by using a semantic segmentation model; and obtain, as the second image, an image comprising the object corresponding to the object class, based on the first segmentation label.

4. The apparatus of claim 3, wherein the semantic segmentation model is different from the image segmentation model.

5. The apparatus of claim 1, wherein, for the training of the image segmentation model, the one or more processors are configured to:

generate a second segmentation label corresponding to the composite image by using the image segmentation model;

determine a first loss for a pixel corresponding to the composite image, based on the second segmentation label;

generate a loss mask based on either one or both of the first image and the second image; and train the image segmentation model based on the first loss and the loss mask.

6. The apparatus of claim 5, wherein the second segmentation label comprises an instance segmentation label.

7. The apparatus of claim 5, wherein, for the determining of the first loss, the one or more processors are configured to:

determine pseudo ground truth based on either one or both of the first image and the second image; and determine the first loss by comparing the second segmentation label with the pseudo ground truth.

8. The apparatus of claim 5, wherein, for the training of the image segmentation model based on the first loss and the loss mask, the one or more processors are configured to train the image segmentation model by using a second loss for a pixel corresponding to the loss mask among the first loss.

9. The apparatus of claim 8, wherein, for the training of the image segmentation model by using the second loss, the one or more processors are configured to train the image segmentation model by using the second loss, based on performance of the image segmentation model.

10. The apparatus of claim 9, wherein, for the training of the image segmentation model by using the second loss, based on the performance of the image segmentation model, the one or more processors are configured to train the image segmentation model by using the second loss in response to intersection over union (IoU) for the image segmentation model being greater than or equal to a threshold.

11. The apparatus of claim 1, wherein the one or more processors are configured to generate an instance segmentation map corresponding to an input image using the trained image segmentation model.

12. A processor-implemented method with image segmentation, the method comprising:

obtaining a second image based on a first segmentation label corresponding to a first image;

generating an object class image separated from the second image, the object class image comprising an object corresponding to an object class of the first image;

generating a composite image by composing the object class image with the first image; and training an image segmentation model based on the composite image, the first image, and the second image.

13. The method of claim 12, wherein the obtaining of the second image comprises:

generating the first segmentation label from the first image by using a semantic segmentation model; and obtaining, as the second image, an image comprising the object corresponding to the object class, based on the first segmentation label.

14. The method of claim 12, wherein the training of the image segmentation model comprises:

generating a second segmentation label corresponding to the composite image by using the image segmentation model;

determining a first loss for a pixel corresponding to the composite image, based on the second segmentation label;

generating a loss mask based on either one or both of the first image and the second image; and training the image segmentation model based on the first loss and the loss mask.

15. The method of claim 14, wherein the second segmentation label comprises an instance segmentation label.

16. The method of claim 14, wherein the determining of the first loss comprises:

determining pseudo ground truth based on either one or both of the first image and the second image; and determining the first loss by comparing the second segmentation label with the pseudo ground truth.

17. The method of claim 14, wherein the training of the image segmentation model based on the first loss and the loss mask comprises training the image segmentation model by using a second loss for a pixel corresponding to the loss mask among the first loss.

18. The method of claim 17, wherein the training of the image segmentation model by using the second loss comprises training the image segmentation model by using the second loss, based on performance of the image segmentation model.

19. The method of claim 18, wherein the training of the image segmentation model by using the second loss, based on the performance of the image segmentation model comprises training the image segmentation model by using the second loss in response to intersection over union (IoU) for the image segmentation model being greater than or equal to a threshold.

20. An apparatus with image segmentation, the apparatus comprising:

one or more processors configured to generate an instance segmentation map corresponding to an input image using a trained image segmentation model;

wherein the image segmentation model is trained based on a composite image, the composite image is generated by generating an object class image separated from a second image, the object class image comprising an object corresponding to an object class of a first image, and composing the object class image with the first image, and the second image is obtained based on a first segmentation label corresponding to the first image.

* * * * *